June 15, 1965 A. C. GLASS 3,189,367
SAFETY CUSHION FOR VEHICLE STEERING WHEELS
Filed Dec. 10, 1962
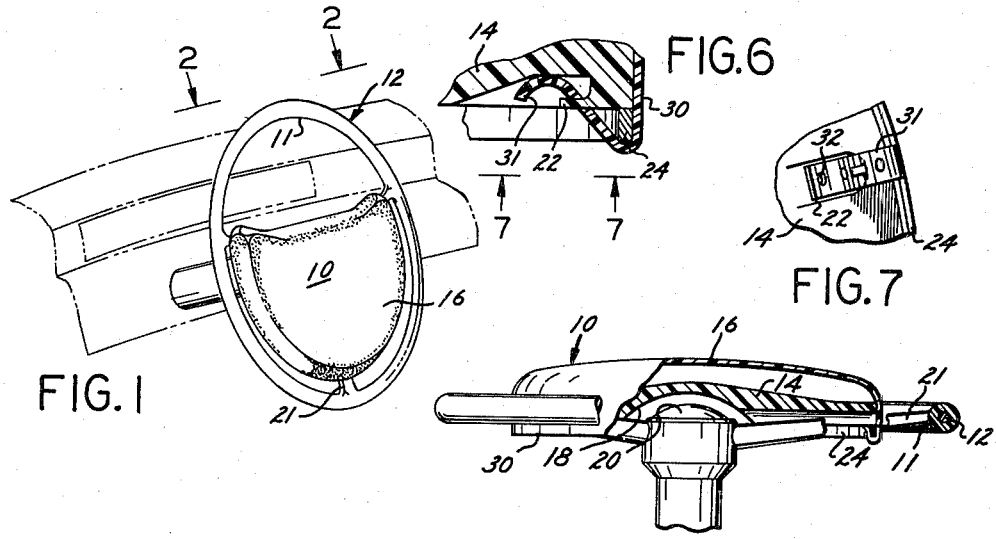
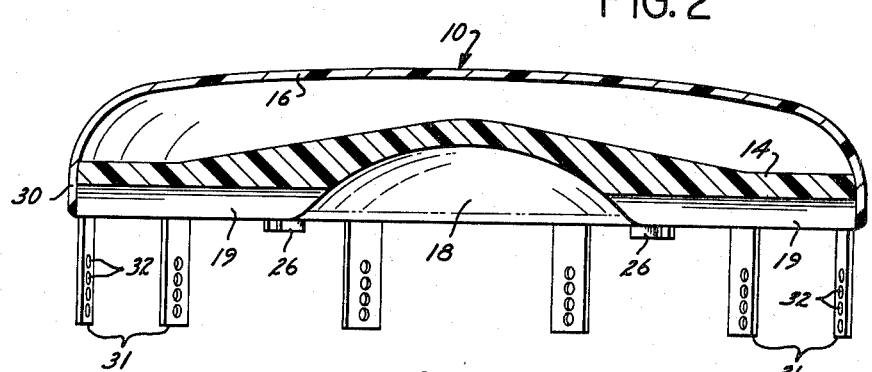
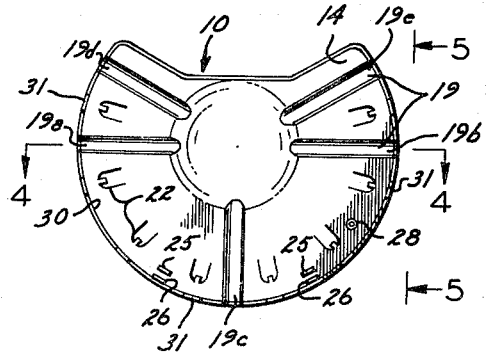
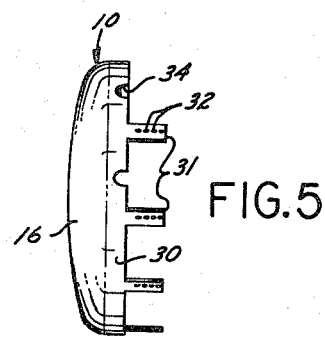
INVENTOR.
ADOLPH G. GLASS
BY R. E. Grangue
ATTORNEY

United States Patent Office 3,189,367
Patented June 15, 1965

3,189,367
SAFETY CUSHION FOR VEHICLE
STEERING WHEELS
Adolph C. Glass, 20146 Hart St., Canoga Park, Calif.
Filed Dec. 10, 1962, Ser. No. 243,358
7 Claims. (Cl. 280—150)

The present invention relates to safety cushions and, more particularly, to an inflatable safety cushion for use on motor vehicles to protect the driver from injury from the steering shaft and steering wheel.

It has long been a problem to protect the driver of an automobile from injury in case of accident by being crushed against the steering wheel and steering post. A number of different types of safety guards have been used for automobile steering wheels and steering posts. Although generally satisfactory, they do have certain drawbacks. One drawback resides in the fact that they must be especially designed to fit different models of automobiles. Another drawback resides in the fact that they do not adequately protect the driver from injury from the steering post. Also, some of them are rather expensive and difficult to install.

In view of the foregoing factors and conditions characteristics of safety devices for automobile steering wheels and steering posts, it is a primary object of the present invention to provide a new and improved safety cushion not subject to the disadvantages enumerated above and having an inflatable portion especially designed to protect the driver of an automobile from injury due to impact with the steering wheel or steering post efficiently and economically.

Another object of the present invention is to provide a safety cushion for the steering wheel of an automobile which is easy to install without the use of any tools.

Still another object of the present invention is to provide a safety cushion of the type described having a configuration making it suitable for use on a number of different types of steering wheels.

A further object of the present invention is to provide a safety cushion for the steering wheel of an automobile which has a rigid, steering-post contacting portion forming the bottom wall of a chamber, the top wall of which is made of an inflatable material which, when the cushion is inflated, is capable of absorbing the impact from a driver of the automobile when being hurled against the cushion in an accident without injury to the driver.

According to the present invention, a safety cushion is provided having a bottom wall of rigid material which is shaped to fit over the dome of a steering post and the individual spokes of a steering wheel. A mushroom-shaped cover member, which is of a flexible material, has its sidewalls secured to the periphery of the bottom wall and is of sufficient flexibility that it may be inflated with air or other suitable substance to form a resilient cushion absorbing a substantial impact. Guide means are provided on the under side of the bottom wall to center it relative to the horn ring of the automobile and clip means are also provided on the under side of the bottom wall to receive flexible straps depending from the flexible cover member for securing the safety cushion to the horn ring. An inlet valve is provided so that the safety cushion may be inflated.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view showing a safety cushion of the invention in position on the steering wheel of an automobile;

FIGURE 2 is an elevational view, partially in cross-section, taken in the direction of arrows 2—2 of FIGURE 1;

FIGURE 3 is a bottom view of the safety cushion of FIGURE 1;

FIGURE 4 is a cross-sectional view, on an enlarged scale, taken along line 4—4 of FIGURE 3;

FIGURE 5 is a side elevational view taken in the direction of arrows 5—5 of FIGURE 3;

FIGURE 6 is an enlarged cross-sectional view of a detail of construction; and

FIGURE 7 is a plan view of the detail of construction shown in FIGURE 6 taken in the direction of arrows 7—7.

Referring again to the drawing, the safety cushion of the present invention, generally designated 10, is shown in position within the confines of the rim 11 of a steering wheel 12 and includes a bottom wall 14 to which a mushroom-shaped top wall member 16 is attached. The bottom wall 14 may be moulded from a suitable plastic material, such as polypropylene, to form a rigid, integral unit which includes an upwardly dished portion 18 having a plurality of spoke engaging recesses 19 extending radially therefrom to fit over the steering post dome 20 and spokes 21 of steering wheel 12. The recesses 19 are spaced about the bottom wall 14 in such a manner that various combinations of them will fit a number of different spoke arrangements. For example, as is best seen in FIGURE 3, the recesses 19a and 19b will fit most two-spoke steering wheels. The recesses 19a, 19b, and 19c will fit one type of three-spoke steering wheel and the recesses 19c, 19d, and 19e will fit another type of three-spoke steering wheel.

A plurality of clips 22 are spaced around the under side of bottom wall 14 and may be moulded therewith as an integral part thereof. The clips 22 are engageable by means to be hereinafter described to secure the cushion 10 to a horn ring 24. Inner depending guides 25 and outer guides 26 are also formed as an integral part of the bottom wall 14 and serve to center the cushion 10 with respect to the horn ring 24 with small diameter horn rings lying adjacent the inner side of inner guides 25 and larger horn rings lying between guides 25 and 26. A valve 28 (FIGURE 5) is provided in the bottom wall 14 so that the cushion 10 may be inflated with air or liquid polyurethane resin of a type which forms a flexible, foamed product.

The flexible, top wall 16 includes a depending skirt portion 30 which encompasses the bottom wall 14 and is secured thereto in airtight relationship therewith. A plurality of flexible straps 31 having apertures 32 depend from the skirt 30 and are adapted to be stretched around the horn ring 24 and engage clips 22, as shown in FIGURES 6 and 7, to secure cushion 10 in position within rim 11. The skirt 30 is recessed, as shown for two recesses 34 (FIGURE 5), to conform to recesses 19 in wall 14. The top wall 16 is preferably made of a heavy rubber-like material such as polyethylene so that, when cushion 10 is inflated, wall 16 will afford sufficient resiliency upon impact to absorb a considerable shock without rupturing.

In use, the cushion 10 is attached to the steering wheel 12 by pulling the flexible straps 31 tightly around horn ring 24 and engaging the clips 22 with apertures 32. The cushion 10 is then inflated with air or polyurethane through valve 28. Since the bottom wall 14 bears against the horn ring 24, the cushion 10 serves to actuate the horn of the automobile on which the cushion is used. As will be noted in FIGURE 2, the cushion 10 mushrooms above the wheel 12 sufficiently to absorb the impact of a driver being thrust forward.

Although a clip 22 is shown in FIGURE 6 as resting directly upon the horn ring 24, it is to be understood that for larger diameter horn rings, the clip 22 would be disposed adjacent the inner wall of the horn ring.

While the particular safety cushion herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A vehicle safety cushion for protection of the driver against injury by the steering post and steering wheel, including the wheel rim, radial spokes, and horn ring, comprising:
    a bottom wall of rigid material in engagement at its outer periphery with said horn ring and located within the confines of said rim;
    said bottom wall substantially covering said horn ring and having a central, rigid steering post contacting portion;
    a plurality of recesses in said wall extending from said central portion for receiving said radial wheel spokes;
    a resilient cushion secured to said wall on the side of said wall opposite said wheel for engaging the chest of the vehicle driver upon impact with the driver; and
    means for securing said wall and cushion to said horn ring.

2. A vehicle safety cushion as defined in claim 1 wherein said bottom wall is substantially flat and said central wall portion comprises an upwardly dished section located above the end of said steering post, said end being dome shaped to permit said dished section to pivot against said dome end after contact of the driver's chest with said cushion and after deformation of said ring and spokes.

3. A vehicle safety cushion as defined in claim 2 wherein said dished section is normally spaced from the dome end of said steering post to provide some movement of said section before engagement with said dome end.

4. A vehicle safety cushion as defined in claim 1 having guide means secured to the side of said wall adjacent said wheel and engaging said horn ring for centering said wall with respect to said horn ring.

5. A vehicle safety cushion as defined in claim 1 wherein said resilient cushion comprises a resilient imperforate member connected to said wall for forming an inflated chamber.

6. A vehicle safety cushion as defined in claim 1 wherein said resilient cushion comprises a flexible layer of material carried by said wall.

7. A vehicle safety cushion as defined in claim 1 wherein said securing means comprises clip means carried by said wall and strap means connected to said clip means and tightly engaging said horn ring.

References Cited by the Examiner

UNITED STATES PATENTS

| | | | |
|---|---|---|---|
| 2,649,311 | 8/53 | Hetrick | 280—150 |
| 2,784,006 | 3/57 | Dye et al. | 280—150 |
| 2,842,372 | 7/58 | D'Antini | 280—29 |
| 2,913,924 | 11/59 | Pratt | 280—150 |
| 3,088,539 | 5/63 | Mathues et al. | 280—150 X |

FOREIGN PATENTS

| | | |
|---|---|---|
| 769,903 | 6/34 | France. |

A. HARRY LEVY, *Primary Examiner.*
LEO FRIAGLIA, *Examiner.*